(No Model.)
G. FORBES.
METHOD OF MEASURING ELECTRICITY.
No. 387,505.  Patented Aug. 7, 1888.
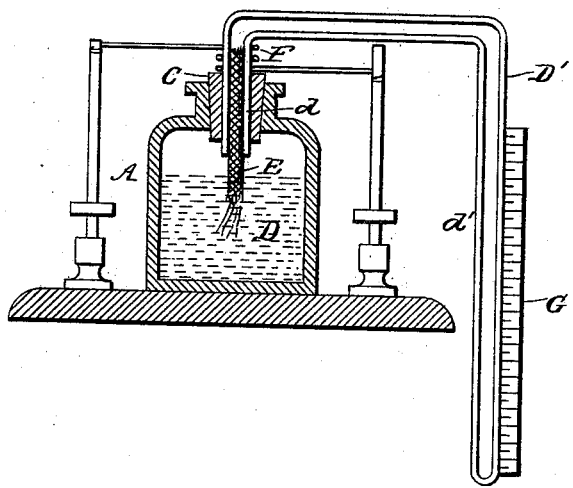
Witnesses.
A. B. Blackwood.
O. W. Humphrey.
George Forbes.
Inventor.
By his Attorneys,
Connolly Bros.

UNITED STATES PATENT OFFICE.

GEORGE FORBES, OF LONDON, ENGLAND.

METHOD OF MEASURING ELECTRICITY.

SPECIFICATION forming part of Letters Patent No. 387,505, dated August 7, 1888.

Application filed March 8, 1888. Serial No. 266,554. (No model.)

*To all whom it may concern:*

Be it known that I, GEORGE FORBES, a subject of the Queen of Great Britain, residing at London, England, have invented certain new and useful Improvements in Methods of Measuring Electricity; and I do hereby declare the following to be a full, clear, and exact description of the invention, reference being had to the accompanying drawings, which form part of this specification.

My invention has relation to methods of measuring electricity, and has for its object the provision of a novel method for accurately determining the quantity of electricity passing through a conductor in a given time.

My invention consists in the novel method of utilizing the heating power of an electric current upon a conductor to produce evaporation of a liquid in a closed vessel, the liquid so evaporated being noted and serving to indicate the quantity of electricity passing through such conductor.

My invention further consists in the novel method of measuring electricity, consisting in passing an electric current through a conductor and thereby heating the same, evaporating a liquid contained in a closed vessel by the aid of said heat, receiving and condensing the vaporized liquid in a separate vessel, and finally measuring the amount of liquid so condensed to determine the amount of current which has passed through the said conductor.

In the accompanying drawing I have shown in a vertical sectional view an apparatus by means of which my method may be conveniently practiced, and in the said drawing A designates a vessel containing a liquid, D, and closed at top by a stopple or plug, C.

D' designates a tube of glass or the like, bent twice at right angles to form a short leg, $d$, which passes through the stopple C and opens into the vessel A, and a longer leg, $d'$, which depends outside the vessel A and is closed at its lower end. A wick, E, of cotton or other suitable absorbent material, dips into the liquid in vessel A and projects up into leg $d$ of tube D'. A coil of wire, F, is wrapped around the outside of leg $d$, and the current to be measured is conveyed through said coil, the latter being preferably of less conductivity than the balance of the conductor through which the current is conveyed, so as to heat more readily. The longer leg, $d'$, of tube D' is provided with a suitable scale, G, by means of which the liquid contents of the said leg may be readily ascertained.

The operation of the apparatus is as follows: The coil F, having been placed in circuit with the conductor conveying the current to be measured, becomes heated by the passage of the current. The liquid in vessel A is absorbed by wick E, and the heat from the coil F produces an evaporation of the liquid in the wick. The vapors created pass over into the leg $d'$ of tube D', are therein condensed, and the amount of liquid collected in said tube serves as a measure of the quantity of electricity which has passed through the coil. The quantity of liquid thus condensed may be ascertained at any time by consulting the scale G.

In practicing my method, by the aid of the above-described apparatus I have found that the amount of electricity passing through the coil F may be accurately determined over a wide range of currents, as the rate of evaporation is proportionate to the quantity of current, and the total quantity of liquid so condensed represents the total quantity of current used.

While I have herein described an apparatus for carrying my invention into effect, I do not claim the same in the present application, as I have made it the subject-matter of a separate application, filed March 8, 1888, No. 266,595.

Having described my invention, I claim—

1. The herein-described method of measuring electricity, consisting in passing the current to be measured through a conductor and thereby heating the same, evaporating a liquid by the aid of the heat so generated, and finally noting the amount of evaporation which has taken place as a measure of the quantity of electricity which has been passed through the conductor, substantially as described.

2. The herein-described method of measuring electricity, consisting in passing an electric current through a conductor arranged in proximity to a quantity of liquid, thereby heating said conductor and evaporating the liquid, then condensing said vaporized liquid in a second vessel, and finally measuring the amount of liquid so condensed, substantially as described.

In testimony that I claim the foregoing I have hereunto set my hand this 17th day of February, 1888.

GEORGE FORBES.

Witnesses:
RUFUS G. BEARDSLEE,
OSCAR BLEEZARD.